United States Patent
Liu et al.

(10) Patent No.: US 12,519,962 B2
(45) Date of Patent: Jan. 6, 2026

(54) OPTIMIZED VIDEO TRANSCODING BASED ON A TIMING REQUIREMENT

(71) Applicant: HULU, LLC, Santa Monica, CA (US)

(72) Inventors: Chen Liu, Beijing (CN); Xuchang Huangfu, Beijing (CN); Xiaobo Liu, Beijing (CN); Wenhao Zhang, Beijing (CN)

(73) Assignee: HULU, LLC, Santa Monica, CA (US)

( * ) Notice: Subject to any disclaimer, the term of this patent is extended or adjusted under 35 U.S.C. 154(b) by 0 days.

(21) Appl. No.: 18/920,621

(22) Filed: Oct. 18, 2024

(65) Prior Publication Data

US 2025/0047883 A1    Feb. 6, 2025

Related U.S. Application Data

(63) Continuation of application No. 18/146,824, filed on Dec. 27, 2022, now Pat. No. 12,160,595.

(30) Foreign Application Priority Data

Nov. 25, 2022 (CN) .......................... 202211491570.6

(51) Int. Cl.
*H04N 7/12* (2006.01)
*H04N 19/105* (2014.01)
(Continued)

(52) U.S. Cl.
CPC .......... *H04N 19/40* (2014.11); *H04N 19/105* (2014.11); *H04N 19/136* (2014.11); *H04N 19/182* (2014.11)

(58) Field of Classification Search
CPC .................................................... H04N 19/40
See application file for complete search history.

(56) References Cited

U.S. PATENT DOCUMENTS

| | | |
|---|---|---|
| 2021/0329279 A1 | 10/2021 | Song et al. |
| 2022/0210492 A1 | 6/2022 | Hassler |
| 2024/0179331 A1 | 5/2024 | Liu et al. |

FOREIGN PATENT DOCUMENTS

| | | |
|---|---|---|
| CN | 112533065 A | 3/2021 |
| JP | 2021514167 A | 6/2021 |

(Continued)

OTHER PUBLICATIONS

Chen et al, "A QoS-Aware Job Rescheduling Mechanism for Service-Oriented Media Distribution Systems", 2011 IEEE 15th International Enterprise Distributed Object Computing Conference Workshops, US, IEEE, Oct. 10, 2011, 252-258, https://ieeexplore.ieee.org/stamp/stamp.jsp?tp=&arnumber=6037626.

(Continued)

*Primary Examiner* — Y Lee
(74) *Attorney, Agent, or Firm* — Kwan & Olynick LLP

(57) ABSTRACT

In some embodiments, a method receives a file for transcoding. A timing requirement is associated with the transcoding of the file. The method generates a prediction of a timing estimation based on characteristics of the file and a set of target configurations. A target configuration in the set of target configurations is associated with a transcoding setting. The timing estimation is analyzed for the set of target configurations and the timing requirement to determine a transcoding configuration of a transcoding system. The transcoding configuration of the transcoding system is output to configure the transcoding system to transcode the file. The file is to be transcoded using at least a portion of the set of target configurations based on configuring of the transcoding system.

19 Claims, 13 Drawing Sheets

(51) Int. Cl.
*H04N 19/136* (2014.01)
*H04N 19/182* (2014.01)
*H04N 19/40* (2014.01)

(56) References Cited

FOREIGN PATENT DOCUMENTS

| JP | 2022503419 A | 1/2022 |
|----|--------------|--------|
| JP | 2022074118 A | 5/2022 |

OTHER PUBLICATIONS

Foreign Office Action, JP Patent Application No. 2023-164274, mailed Dec. 3, 2024.
Deneke Tewodors et al: "Video transcoding 1-15 time prediction for proactive load balancing", 2014 IEEE International Conference Onmultimedia and Expo (ICME), IEEE, Jul. 14, 2014 (Jul. 14, 2014), pp. 1-6, XP032639085, DOI: 10.1109/ICME.2014.6890256 [retrieved on Sep. 3, 2014].
Extended European Search Report, EP Application No. 23206482.4, dated Apr. 16, 2024, 10 pages.
Ing-Yi Chen et al: "A QoS-Aware Job Rescheduling Mechanism for Service-Oriented Media Distribution Systems", Enterprise Distributed Object Computing Conference Workshops (EDOCW), 2011 15th IEEE International, IEEE, Aug. 29, 201 (Aug. 29, 2011), pp. 252-258, XP032058932, DOI: 10.1109/EDOCW.2011.42 ISBN: 978-1-4577-0869-5.

| Profile Name | Output Resolution | Video Bitrate (kbps) |
|---|---|---|
| HEVC_280 | 384x216 | 280 |
| HEVC_400 | 480x270 | 400 |
| HEVC_600 | 640x360 | 600 |
| HEVC_900 | 864x486 | 900 |
| HEVC_1600 | 1280x720 | 1600 |
| HEVC_2400 | 1280x720 | 2400 |
| HEVC_3600 | 1920x1080 | 3600 |
| HEVC_4800 | 1920x1080 | 4800 |
| HEVC_6000 | 2560x1440 | 6000 |
| HEVC_8000 | 2560x1440 | 8000 |
| HEVC_12000 | 3840x2160 | 12000 |
| HEVC_16000 | 3840x2160 | 16000 |

FIG. 5

| Profile Name | Out Resolution | Video Bitrate (kbps) | T_avail able (sec) | ABR_profile_T_estimation for low-end group (sec) | ABR_profile_pass_flag for low-end group | ABR_profile_T_estimation for high-end group (sec) | ABR_profile_pass_flag for high-end group |
|---|---|---|---|---|---|---|---|
| Profile 1 | 384x216 | 280 | 14400 | 4600 | True | 1400 | True |
| Profile 2 | 480x270 | 400 | 14400 | 7800 | True | 1800 | True |
| Profile 3 | 640x360 | 600 | 14400 | 11000 | True | 3200 | True |
| Profile 4 | 864x486 | 900 | 14400 | 13900 | True | 3900 | True |
| Profile 5 | 1280x720 | 1600 | 14400 | 14800 | False | 8000 | True |
| Profile 6 | 1280x720 | 2400 | 14400 | 15200 | False | 8300 | True |
| Profile 7 | 1920x1080 | 3600 | 14400 | 16500 | False | 11000 | True |
| Profile 8 | 1920x1080 | 4800 | 14400 | 17300 | False | 12500 | True |
| Profile 9 | 2560x1440 | 6000 | 14400 | 18500 | False | 15000 | False |
| Profile 10 | 2560x1440 | 8000 | 14400 | 23500 | False | 15600 | False |
| Profile 11 | 3840x2160 | 12000 | 14400 | 28000 | False | 21600 | False |
| Profile 12 | 3840x2160 | 16000 | 14400 | 30000 | False | 22000 | False |

FIG. 11

OPTIMIZED VIDEO TRANSCODING BASED ON A TIMING REQUIREMENT

CROSS REFERENCE TO RELATED APPLICATIONS

This application is a continuation application and, pursuant to 35 U.S.C. § 120, is entitled to and claims the benefit of earlier filed application U.S. application Ser. No. 18/146,824, filed Dec. 27, 2022, entitled "OPTIMIZED VIDEO TRANSCODING BASED ON A TIMING REQUIREMENT", which, pursuant to 35 U.S.C. § 119(a), is entitled to and claims the benefit of the filing date of Chinese Patent Application No. 2022114915706 filed Nov. 25, 2022, entitled "OPTIMIZED VIDEO TRANSCODING BASED ON A TIMING REQUIREMENT", the content of all of which is incorporated herein by reference in its entirety for all purposes.

BACKGROUND

A video delivery system may receive video asset files and transcode the video asset files according to different transcoding configurations. For example, a video asset file may be transcoded into multiple profiles where each profile represents a different configuration of characteristics (e.g., bitrate, resolution, codec, etc.). When the video is published on a service, a client may request playback of the video. During playback, the client may switch among any of the profiles based on the current playback conditions that are being experienced by the client.

In some cases, the video delivery system may have requirements on when the video should be published. For example, a requirement may be that the video should be published within a certain time period, such as five hours after a time (e.g., five hours after receiving the video asset file). The transcoding time of different video asset files may vary a lot due to the nature of the respective video content included in the respective video asset files. For example, for the same profile, video with complex textures and motion may take longer to transcode compared to a video with less complex textures and motion. The video delivery system may have limited perspective on how fast the video asset file may be transcoded into the different profiles. Accordingly, the video delivery system may find it difficult to deliver a transcoded version of video asset files to meet the timing requirement.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 5 depicts a table of target configurations for profiles according to some embodiments.

FIG. 11 depicts a table that shows information that summarizes information that is used to generate an optimization strategy according to some embodiments.

DETAILED DESCRIPTION

Figure 1:
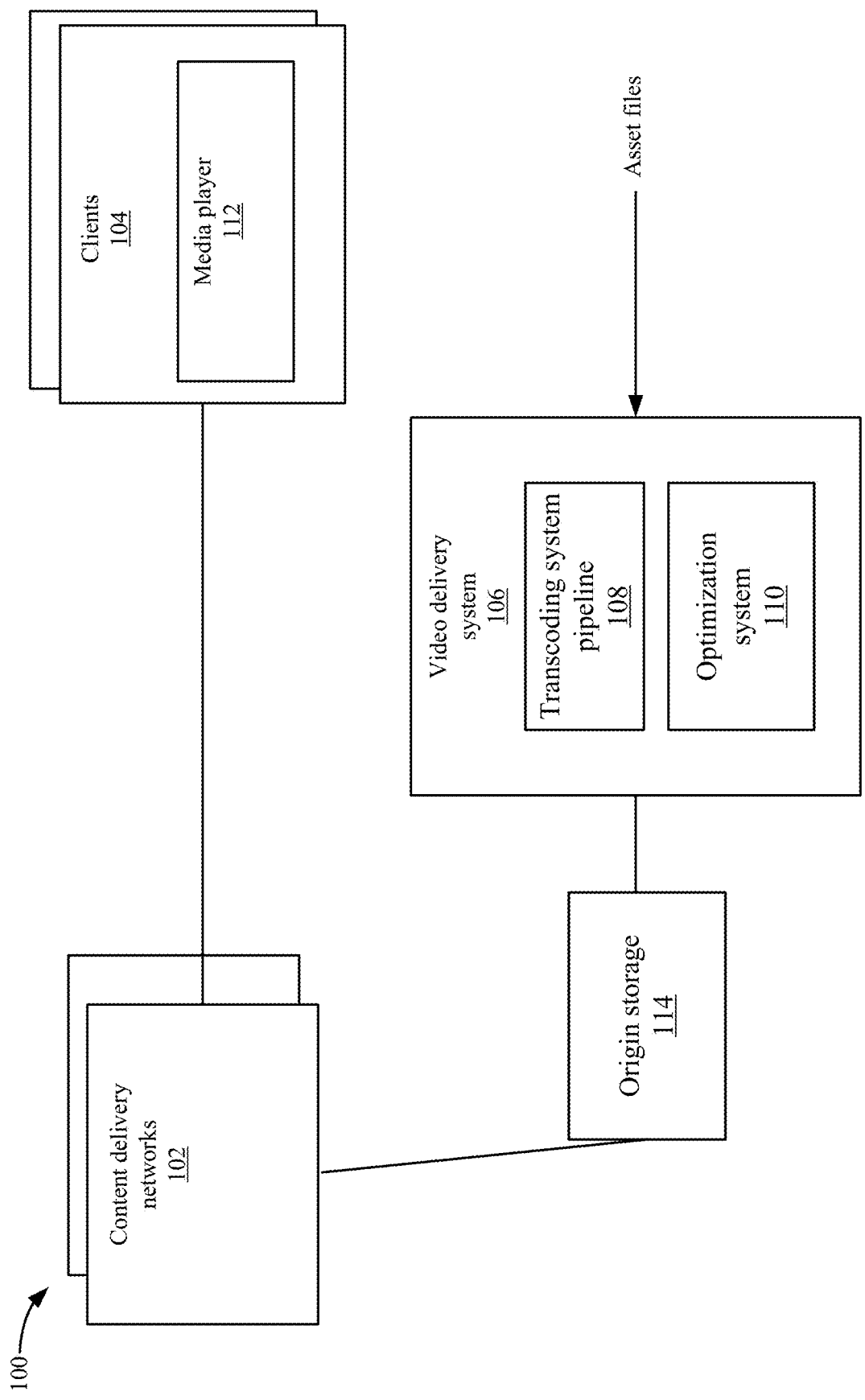
FIG. 1 depicts a simplified system for transcoding video asset files according to some embodiments.

Described herein are techniques for a video delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

A video delivery system may optimize the transcoding of a video asset file into profiles. Profiles may be designed for an adaptive bitrate streaming application where the profiles may define different transcoding configurations, such as a video resolution, bitrate, codec, and other settings. For example, a first profile may have an output resolution of 384×216 and a video bitrate of 280 kilobytes per second (kbps), and a second profile may have an output resolution of 480×270 and a video bitrate of 400 kbps. The profiles may also include other settings, such as specifying the codec type, such as H.264, H.265, etc.

The video delivery system may have a requirement for a video asset file, such as a timing requirement for publishing of the video on a service. The publishing of a video may be where the video can be accessed by a client being used by a user account of a service, such as for playback of the video. Before being published, the video delivery system may have to transcode the video asset file into one or more profiles. The requirement may limit the time that can be taken to transcode the video asset file. The following may be an example of when a requirement is received for a video asset file, but other scenarios may be appreciated. An asset may be broadcast on a linear time schedule, such as an episode of a show may be broadcast at a scheduled time. The video delivery system may receive a video asset file for the asset that was broadcast. For example, a video asset file for the show may be received before, during, or after it is broadcast at the scheduled time. Then, the video delivery system transcodes the video asset file. For example, the video asset file may be transcoded as a video-on-demand asset, which is an asset that may be requested at any time. The video-on-demand asset may be available in different profiles. The video delivery system may receive a requirement (e.g., from an entity that broadcast the show or from an internal requirement) that may specify a time for publishing the video on the video delivery system. For example, an episode of a show may be broadcast and a video asset file may be received at 7:00 p.m. Then, the video delivery system may have until 11:00 p.m. to publish the video on its video delivery service. Accordingly, the video delivery system may have four hours to transcode the video. Previously, the video delivery system may not know how long the asset file may take to transcode. For example, it is possible that some video profiles may not be transcoded in time to meet the requirement, such as by 11:00 p.m. It is also possible that some profiles may be transcoded before the requirement, such as by 8:00 p.m. The first situation may result in a profile not being available at the required time. The second situation may result in a transcoding of a video that does not efficiently using the available time. For example, the video asset file may have been transcoded at a higher quality by taking additional time to transcode the video asset file. Although the above example is discussed, the video delivery system may receive a timing requirement in other scenarios. For example, internal requirements at the video delivery system may require a video to be released by a certain time, movies may have to be released by a certain time, etc.

To overcome the above problems, the video delivery system may predict a transcoding timing estimation for transcoding the video asset file. For example, the video delivery system may extract features of the video asset file and predict the transcoding time for transcoding the video asset file into the different profiles. The prediction process will be described in more detail below. Using the predicted transcoding timing estimation, the video delivery system may determine which profiles may be transcoded to meet the timing requirement. Using this information, the video delivery system may optimize the transcoding process. For example, the video delivery system may choose not to transcode some profiles that may not meet the requirement, which may save the use of computing resources. Also, the video delivery system may optimize the orchestration of the transcoding of some profiles. For example, some profiles may be allocated to different computing resources based on the prediction. The transcoding system may include low-end computing nodes and high-end computing nodes. The low-end computing nodes may transcode a video asset file slower than high-end computing nodes, but the low-end computing nodes may cost less to use. A profile that is predicted to finish before the timing requirement may be allocated to a low-end computing node that may not transcode the video asset file as fast as another computing node. In some embodiments, the prediction may be improved to predict whether the profile can be transcoded by a low-end computing node or not. This may improve the orchestration because low-end computing nodes may cost less and this may save cost. In another example, if a profile may not be transcoded within the timing requirement, then the video delivery system may alter some characteristics of the profile to possibly transcode the video asset file to meet the requirement. For example, a codec may have different settings that may allow the transcoder to transcode a video asset file faster. The video delivery system may choose settings within the profile to transcode a video faster, which is an improvement over predicting the video asset file cannot be transcoded based on the requirement. This improves the transcoding process because some profiles that may not have been available to publish based on the timing requirement may now be available to meet to timing requirement.

System Overview

FIG. 1 depicts a simplified system 100 for transcoding video asset files according to some embodiments. System 100 includes content delivery networks 102, clients 104, and a video delivery system 106. Video asset files may include different types of content, such as video, audio, or other types of content information. Video may be used for discussion purposes, but other types of content may be appreciated. In some embodiments, an asset file may be received in a format that requires transcoding to another format, which will be discussed below. For example, the video asset file may be a mezzanine file that includes compressed video. The mezzanine file may be transcoded (e.g., encoded) to create other files, such as different profiles of the video.

A content provider may operate video delivery system 106 to provide a content delivery service that allows entities to request and receive media content. The content provider may use video delivery system 106 to coordinate the distribution of media content to clients 104. The media content may be different types of content, such as on-demand videos from a library of videos and live videos. In some embodiments, live videos may be where a video is available based on the linear schedule. Videos may also be offered on-demand. On-demand videos may be content that can be requested at any time and not limited to viewing on a linear schedule. The videos may be programs, such as movies, shows, advertisements, etc. As discussed above, the video for a video asset file may be offered as a live video and also on demand; however, other scenarios may exist, such as there may be timing requirement for a movie that is released.

Client 104 may include different computing devices, such as smartphones, living room devices, televisions, set top boxes, tablet devices, etc. Client 104 includes a media player 112 that can play content, such as a video. In some embodiments, media player 112 receives segments of video and can play these segments. Client 104 may send requests for segments to content delivery network 102, and then receive the requested segments for playback in media player 112. The segments may be a portion of the video, such as six seconds of the video.

A video may be transcoded in multiple profiles that correspond to different configurations, which may be different levels of bitrates and/or quality, but may also include other characteristics, such as codec type, computing resource type (e.g., computer processing unit), etc. Each video may have associated profiles that have different configurations. The profiles may be classified at different levels and each level may be associated with a different configuration. For example, a level may be combination of bitrate, resolution, codec, etc. For example, each level may be associated with a different bitrate, such as 400 kilobytes per second (kbps), 650 kbps, 1000 kbps, 1500 kbps, . . . 12000 kbps. Also, each level may be associated with another characteristic, such as a quality characteristic (e.g., resolution). The profile levels may be referred to as higher or lower, such as profiles that have higher bitrates or quality may be rated higher than profiles with lower bitrates or quality.

Content delivery network 102 includes servers that can deliver a video to client 104. Content delivery network 102 receives requests for segments of video from client 104, and delivers segments of video to client 104. Client 104 may request a segment of video from one of the profile levels based on current playback conditions. The playback conditions may be any conditions that are experienced based on the playback of a video, such as available bandwidth, buffer length, etc. For example, client 104 may use an adaptive bitrate algorithm to select the profile for the video based on the current available bandwidth, buffer length, or other playback conditions. Client 104 may continuously evaluate the current playback conditions and switch among the profiles during playback of segments of the video. For example, during the playback, media player 112 may request different profiles of the video asset. For example, if low bandwidth playback conditions are being experienced, then media player 112 may request a lower profile that is associated with a lower bitrate for an upcoming segment of the video. However, if playback conditions of a higher available bandwidth are being experienced, media player 112 may request a higher-level profile that is associated with a higher bandwidth for an upcoming segment of the video.

Video delivery system 106 may transcode video asset files that are received and publish the transcoded videos on a service in which clients 104 can request playback of the videos. To perform the transcoding, video delivery system 106 may include a transcoding system pipeline 108 and an optimization system 110. Transcoding system pipeline 108 may transcode video asset files using computing resources (e.g., transcoding systems). Optimization system 110 may optimize the transcoding of video asset files.

In the video transcoding process, video delivery system 106 may receive video asset files that require transcoding from one format to another format. For example, as discussed above, after the broadcast of a video asset, video delivery system 106 may receive a video asset file for a video asset. In some examples, an episode of a show may be broadcast. and the video asset file is received by video delivery system 106 at 7:00 pm, such as before, during, or after the broadcast. As discussed above, transcoding system pipeline 108 may have a timing requirement, such as 11:00 p.m., to transcode the video asset file into at least one different profile, where each profile may be another video file. Once the transcoding of at least one profile is complete, video delivery system 106 may publish the video asset on the service. In some embodiments, video delivery system 106 may publish the profiles that are transcoded on origin storage 114. Then, content delivery networks 102 may receive a request and receive the profiles from origin storage 114 when they are requested by clients 104. Other configurations may also exist, such as the profiles may be individually sent to each content delivery network 102.

After publishing the profiles, the video asset may be requested and delivered to a client 104 for playback. For example, after broadcast, video delivery system 106 may publish the video asset as a video-on-demand asset, which may be requested at any time by a client 104. In some examples, a user account may request playback of an episode of a show at a later time after 11:00 p.m.

Transcoding system pipeline 108 may include different computing resources that may perform the transcoding, such as transcoding nodes that may include different characteristics. The different characteristics may affect transcoding time. For example, a low-end computing node may have a lower performance CPU and the high-end computing node may have a higher performance CPU. The low-end computing node may transcode the video asset file slower than a high-end computing node.

Optimization system 110 may analyze features that are associated with the video asset file and generate an optimization strategy for transcoding the video asset file. As will be discussed in more detail below, optimization system 110 may predict a transcoding timing estimation for different profiles. Then, using a requirement for the video asset file, such as a transcoding time that is based on a publish time, optimization system 110 may generate a transcoding optimization strategy. For example, optimization system 110 may determine which profiles may be transcoded within the timing requirement based on the predicted transcoding timing estimation. Another strategy may attempt to change some configurations of a profile that is predicted to not be able to finish transcoding to meet the timing requirement such that the profile can be transcoded to meet the timing requirement. Yet another strategy may be to efficiently allocate transcoding of profiles on computing resources in transcoding system pipeline 108.

The following will now describe different scenarios that illustrate advantages of using optimization system 110 followed by additional details of the optimization process.

Scenarios

Figure 2A:
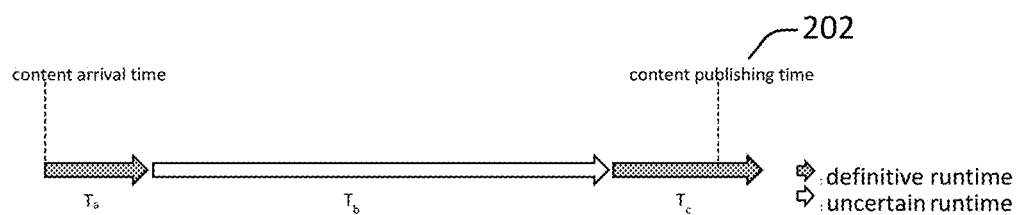
FIGS. 2A and 2B depict different scenarios that may result when transcoding a video asset file with an uncertain transcoding time.
Figure 2B:
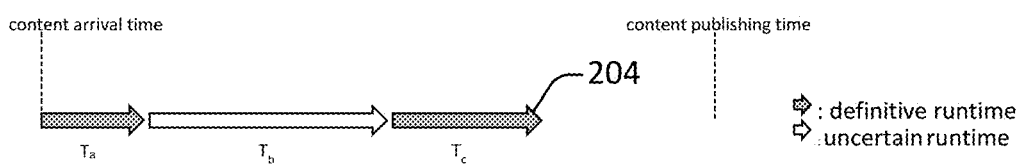
Figure 2C:
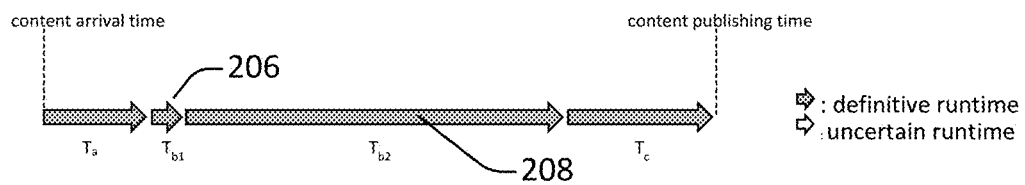
FIG. 2C depicts a scenario when using an optimization according to some embodiments.

FIGS. 2A and 2B depict different scenarios that may result when transcoding a video asset file. FIG. 2C depicts a scenario when using an optimization according to some embodiments. FIGS. 2A to 2C show a content arrival time, which may be when a video asset file is received. For example, an episode of a show may arrive at a content arrival time of 7:00 p.m. Video delivery system 106 may be given a limited time window to publish the content. For example, the limited time window may have a content publishing time at 11:00 p.m.

The transcoding process of the video asset file may include different parts. For example, a first part $T_a$ may be processing time spent on preparing the transcoding job. Different preparation tasks may be performed, which may include ingestion, resource allocation, and any pre-processing analysis of the video asset file. A second time $T_b$ may be the video transcoding time that is taken to transcode the video asset file into a profile. A third time $T_c$ is the processing time after the transcoding job is finished, which may include packaging, encrypting, sending the video to a CDN network, etc. The processing time taken for times $T_a$ and $T_c$ may be fixed time windows that may be known for each video asset file. However, time $T_b$ may not be known due to the transcoding time variations that may depend on the respective characteristics of each video asset file and the capability of computing nodes that may perform the transcoding as discussed above.

Potential problems may result due to the uncertain transcoding time. For example, FIG. 2A depicts a first problem that results from an uncertain transcoding time and FIG. 2B depicts a second problem that results from an uncertain transcoding time. In FIG. 2A, the transcoding time $T_b$ may be too long such that the video asset file for a profile may not be ready at the content publishing time as shown at 202. Also, in FIG. 2B, the transcoding time $T_b$ may be shorter, which results in the video asset file for the profile being available at 204, which is before the content publishing time. In this case, the available time may not be fully optimized. For example, it is possible that a higher quality transcoding may have been performed in the time window that was allowed, such as the transcoding may be performed slower. That is, a transcoder may take more time to process the video, which may result in a higher quality transcoding.

FIG. 2C depicts an optimized transcoding timeline using an optimization strategy according to some embodiments. For example, at 206, a time $T_{b1}$ is the time spent on the optimization analysis by optimization system 110. Then, at 208, time $T_{b2}$ is the transcoding time that is predicted by optimization system 110. The transcoding of the video asset file for the profile may then be ready by the content publishing time, which provides an optimized use of the time window. For example, a transcoder may be selected that may transcode the video asset file for the profile for the highest possible quality in the time window while still meeting the timing requirement based on the predicted transcoding timing estimation.

In FIG. 2C, the tasks of first part $T_a$ of processing time spent on preparing the transcoding job, the optimization analysis at 206, and the transcoding at 208 are shown in a serial, step-by-step order. In some embodiments, some of these tasks can be triggered and run in parallel. For example, the preparation task and the optimization analysis may be run in parallel. Also, the optimization analysis and the transcoding may also be run in parallel. The task of transcoding time prediction may run faster than the task of transcoding the video asset file, and the transcoding time information is available before the task of transcoding is finished. Once the transcoding time prediction is known, optimization system 110 may determine whether the transcoding task will be continued or terminated accordingly to the prediction. For example, if the transcoding will not finish such that the timing requirement will be met, optimization system 110 may terminate the task. In these embodiments, the time $T_{b1}$ spent on the optimization analysis will not introduce any delay in the transcoding tasks, but it may require that some transcoding tasks are started and terminated rather than not started at all. The optimization will now be described in more detail.

Optimization System

Figure 3:
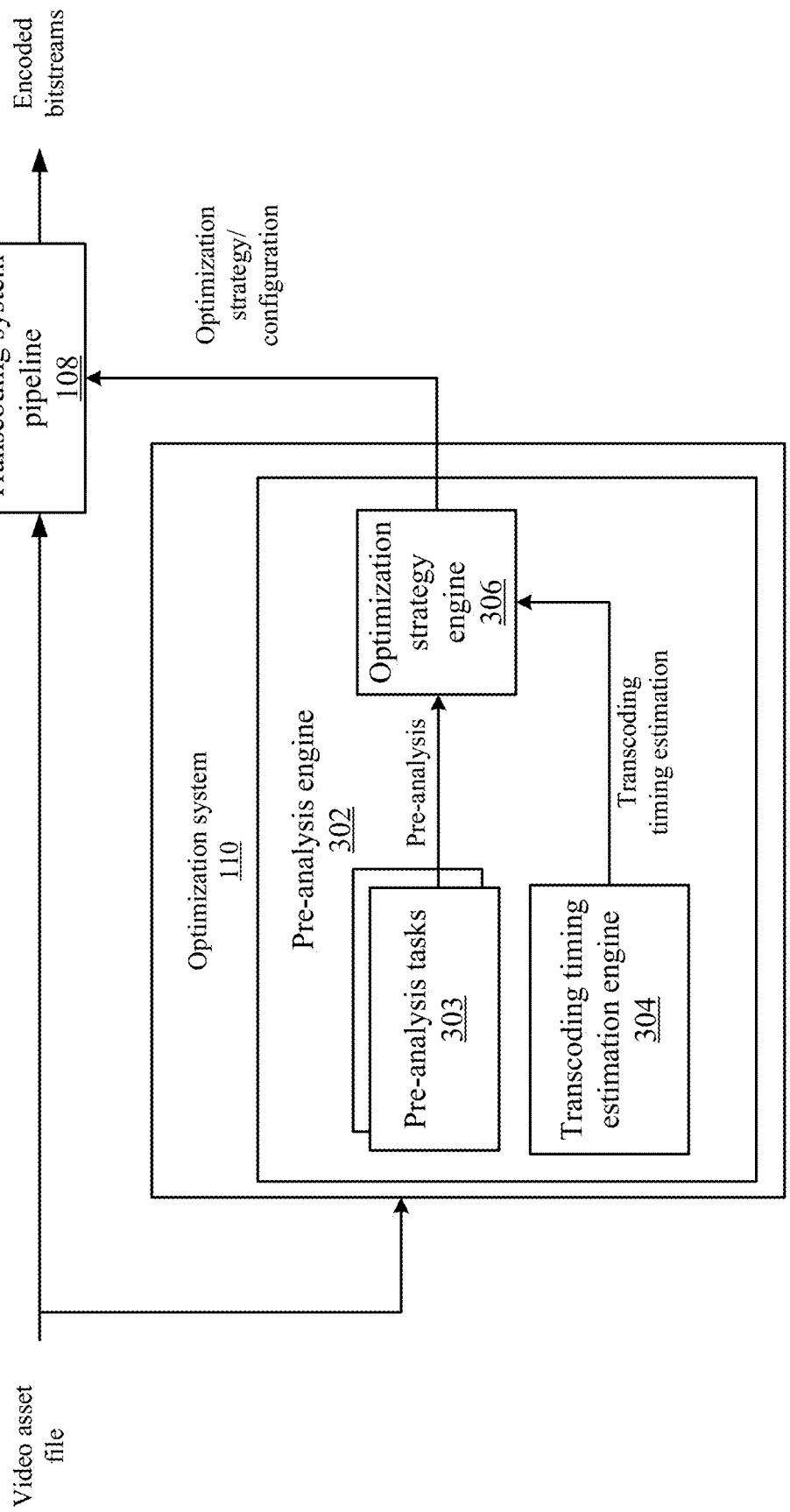
FIG. 3 depicts a more detailed example of optimization system according to some embodiments.

FIG. 3 depicts a more detailed example of optimization system 110 according to some embodiments. A video asset file is received at optimization system 110 and transcoding system pipeline 108. A pre-analysis engine 302 may perform the pre-analysis tasks 303 that are needed to prepare the transcoding job. For example, the pre-analysis tasks 303 may include pre-processing tasks, such as may include content classification based transcoding parameter tuning, configuring profile settings, and so on. These tasks may be performed in parallel. Pre-analysis engine 302 may also determine any timing requirements for the video asset file. In another pre-analysis task, transcoding timing estimation engine 304 may generate a transcoding timing estimation using features of the video asset file. As discussed above, the timing estimation may be performed in parallel with other pre-analysis tasks 303 or the transcoding. The transcoding timing estimation may be generated for multiple profiles. Each profile may have a predicted time that will be required to transcode the video asset file. Also, the transcoding time estimation may be an estimation to transcode the whole video asset, but can be applied to finer granularities, such as a chunk, a segment, or a given period or portion of the video asset. Transcoding timing engine 304 outputs the transcoding timing estimation to an optimization strategy engine 306. Optimization strategy engine 306 analyzes the transcoding timing estimation and the requirement for the transcoding of the video asset file, and outputs an optimization strategy. The optimization strategy may be used to determine a configuration of transcoding system pipeline 108. The optimization strategy may involve determining which profiles to transcode, and assigning computing resources to transcode the profiles. The configuration configures transcoding system pipeline 108 to transcode the video asset file into one or more profiles based the optimization strategy, such as profiles that can be transcoded within the timing requirement are transcoded. An encoded bitstream is then output for the different profiles, such as to origin storage 114 and/or content delivery networks 102. The following will now describe the transcoding timing estimation in more detail and then the generation of the optimization strategy.

Transcoding Timing Estimation

Figure 4:
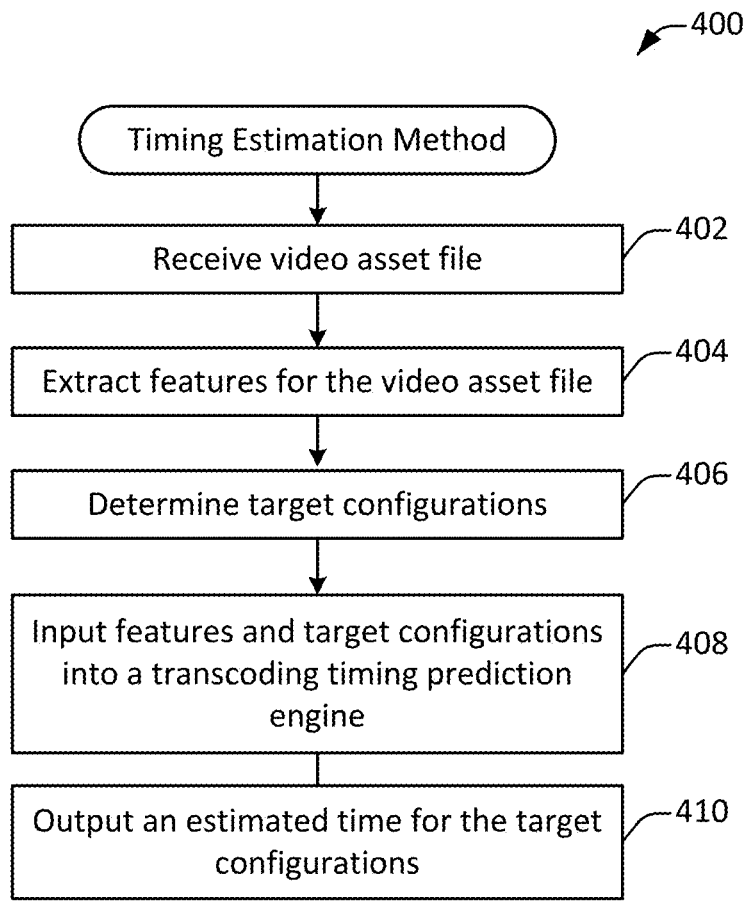
FIG. 4 depicts a simplified flowchart of a method for generating the transcoding timing estimation according to some embodiments.

FIG. 4 depicts a simplified flowchart 400 of a method for generating the transcoding timing estimation according to some embodiments. At 402, optimization system 110 receives a video asset file. For example, as discussed above, after being broadcast, a video asset file for a video is received at 7:00 p.m. At 404, optimization system 110 extracts features for the video asset file. The features may be based on characteristics of video for the video asset file. In some embodiments, the features may be based on information that may be related to video transcoding. The following features may be used, but other features may be appreciated. For example, the features may include video asset level features, video pixel level features, video spatial features, video temporal features, video frequency features, and proxy transcoding information. The video asset level feature may include asset resolution, duration, container, codec, the range (standard dynamic range, high dynamic range, etc.), and other features. The codec may be a coder/decoder that may be responsible for encoding and decoding video files. A codec may compress and decode files to create digital files. Different codecs may be associated with different standards, such as H.264, H.265, etc. A container may be a file format that stores the video content and is responsible for transcoding the content. The asset resolution may be the resolution of the asset and the duration is the running time of the video.

Video pixel level features may include luminance, histogram, average pixel values, variants of pixel values, etc. The luminance may describe the luminance of frames of the video. The histogram of an image may refer to the histogram of characteristics of an image, such as the pixel intensity values. Average spatial values and variants of pixel values may describe the values of the pixels. The values may be organized by pixel, by blocks in a frame, by frame, or by multiple frames.

Video spatial features may include texture edges, gradient, etc. The video temporal features may include motion, optical flow, etc. Video frequency features may include transform coefficients, etc. Proxy transcoding information may include possible transcoding alternatives to increase the speed of transcoding, such as faster transcoding using a smaller resolution, smaller target bitrate, decimated video frames or a portion of the original video asset file. Decimated video frames may remove some video frames from the video asset file.

After extracting the features, at 406, optimization system 110 determines target configurations. The target configurations may be used in the transcoding process, such as the target configuration may be structured as a combination of fields that specify different values for settings that are used in the transcoding process. An example of different target configurations is described in FIG. 5. A target configuration may include a combination of the following features:

Computing Recipe
    CPU model
    CPU core number
    . . .
ABR Recipe
    Output resolution
    Output bitrate
    Segment duration
    . . .
Codec Recipe
    Codec standard, such as AVC, HEVC, AV1 . . .
    Codec preset, such as x264_fast, x265_slower, libaom_cpu2 . . .
    Codec finer controls, such as b-frame numbers, motion search method/range . . .
    Rate control methods, such as VBR-1pass, VBR-2pass
    . . .
    . . .
. . .

At 408, optimization system 110 may input the features and the target configurations into transcoding timing estimation engine 304. Transcoding timing estimation engine 304 may be a prediction network (e.g., machine learning module) that may accept the features and the target configurations, and output a prediction for a transcoding timing estimation. In some embodiments, transcoding timing estimation engine 304 may receive multiple target configurations concurrently and include multiple outputs that output multiple predictions together for the target configurations. In another example, transcoding timing estimation engine 304 may receive one target configuration separately and output the transcoding timing estimation for that target configuration. The process may be run for each target configuration in this case.

At 410, optimization system 110 outputs transcoding timing estimations for the target configurations. The output may be used in generating an optimization strategy as described below.

The transcoding timing estimation may be based on a training of a prediction network. Different machine learning algorithms may be used by the prediction network. Depending on the specific machine learning algorithm, a trained model may be prepared, managed, and used in the prediction network. In some embodiments, the models may be trained offline using a training process. A separate model may be prepared for each target configuration, or a group of target configurations when using a multi-output design. A training data set may be used based on historical transcoding jobs' results of other video asset files and can be used as ground truth. In addition, extra transcoding jobs can be launched to determine training data for the target configurations. Then, the model may be trained by inputting the features of the training data set and comparing the results to the ground truth to adjust the parameters of the model. That is, the parameters may be adjusted such that the prediction network generates a prediction closer to the ground truth based on the same input. The trained model may be able to predict a transcoding timing estimation for a profile based on the features of the video asset file and the target configuration.

The above process is an improvement over the process described in FIGS. 2A and 2B. Instead of relying on an uncertain transcoding time or possibly using a fixed transcoding time, optimization system 110 predicts the transcoding time. This improves the process of determining a transcoding time. The use of features for a video asset file may customize the transcoding timing estimation for specific characteristics of the video asset file. This improves the transcoding timing estimation as it may be more accurate by taking into account specific characteristics of a video that may affect transcoding time. A fixed transcoding time does not take into account the specific features of a video asset file.

As discussed above, a target configuration may be associated with a profile. FIG. 5 depicts a table 500 of target configurations for profiles according to some embodiments. Table 500 includes a first column 502 that describes the profile name, a second column 504 indicates the output resolution, and a third column 506 that shows the video bitrate. For example, at 508, for a profile "HEVC_600" the output resolution is "640×360" and the video bitrate is "600" kbps. At 510, for a second profile "HEVC_8000" the output resolution is "2560×1440" and the video bitrate is 8000 kbps. The resolution and bitrate may be settings of the target configuration that are used when transcoding the video asset file. The transcoder would transcode the video using these settings, such as a transcoder may transcode the video asset file with a target of an output resolution of 640×360 and a video bitrate of 600 kbps. Other features (e.g., CPU, Codec) may also be specified for the profiles, but are not shown. Once determining the transcoding timing estimation, optimization strategy engine 306 may analyze the transcoding timing estimation and generate an optimization strategy.

Optimization Strategies

Figure 6:
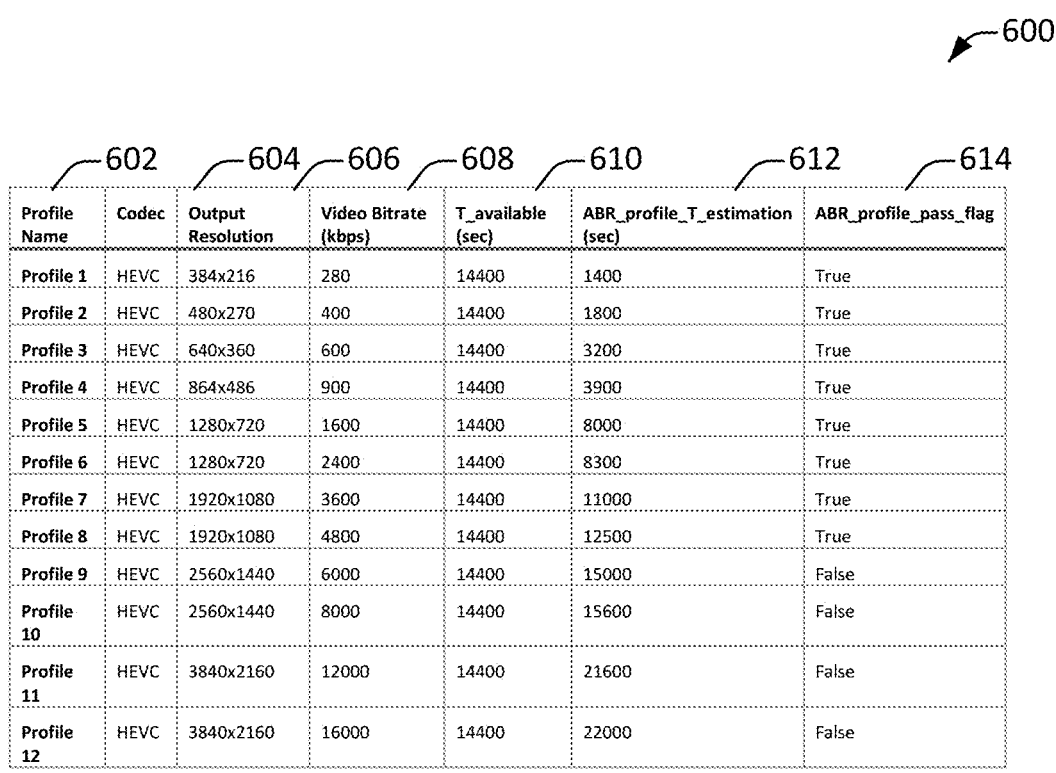
FIG. 6 depicts a table that shows a summary of information that may be used to generate the optimization strategy according to some embodiments.

FIG. 6 depicts a table 600 that shows a summary of information that may be used to generate the optimization strategy according to some embodiments. Columns 602, 604, 606, 608, and 610 may list settings of a profile. For example, column 602 describes the profile name, such as profile 1, profile 2, or profile 3. Columns 604, 606, and 608 describe transcoding settings of the profile, such as the codec, output resolution, and video bitrate, respectively. Other settings of the profile may also be used, but are not shown.

Column 610 may be a timing requirement. In this case, the timing requirement may estimate the available time (T_available) in which transcoding should finish to meet the timing requirement. The timing requirement may be based on a content publishing time as discussed above. This may allow the profile for the video asset file to be published at the content publishing time. For example, the available time is 14,400 seconds. This may be the total amount of time that can be used for transcoding the video asset file. The available time T_available may be based on the time described in FIG. 2C, such as the content publishing time–content arrival time–time $T_a$–time $T_{b1}$–time $T_c$ for each profile. That is, the available time may be time $T_{b2}$ in FIG. 2C. It is noted that different profiles may have different available times associated with them, such as profile 1 may have a different time $T_a$ compared to profile 3. Then, profile 1 may have 15,000 seconds and profile 3 may have 14,400 seconds as available time. The timing requirement may also be in other forms, such as a publish time, an end time (e.g., 10:00 pm if started upon content arrival), etc. Also, the timing requirement may be determined in other ways, such as based on portions of tasks being run in parallel. Further, the timing requirement may be in other formats, such as the content publishing time may be the timing requirement, and the transcoding time may be added to the other times that are required to be performed to publish the video asset to determine whether the timing requirement is met. For example, times time $T_a$, time $T_{b1}$, time $T_b$, and time $T_c$ may be used to determine whether the publish time will be met.

A column 612 may be the transcoding timing estimation for each profile. The transcoding timing estimation may be an amount of time that is required to finish the transcoding of a profile. For example, for profile 3, the transcoding time is estimated at 3200 seconds and for profile 10, the transcoding time is estimated at 15,600 seconds. The transcoding timing estimation may also be in other forms, such as an end time (e.g., 10:00 pm), etc.

Optimization strategy engine 306 may generate an output based on the available time and the transcoding timing estimation. For example, the output may indicate whether a respective profile can be transcoded within the available time. In some embodiments, a column 614 may be a flag that may be set to a first value (e.g., true) and a second value (e.g., false). The true flag would be set when the profile may be transcoded in a time that is in the available time. The false flag would be sent when the profile could not be transcoded within the available time. Although a flag is discussed, other information may be output. For example, a value may be set based on a comparison of the available time and the transcoding timing estimation. For example, for profile 1, the value 14,400−1,400=13,000 may be output, which may indicate there is an extra 13,000 seconds in the time window to transcode the profile. For profile 10, the value 14,400−15,600=−1200 may be output, which may indicate there is a need for 1200 more seconds in the time window to transcode the profile.

In the above example, profiles 1-8 have the flag ABR_profile_pass_flag set to true. The true value indicates that these profiles can be successfully transcoded and published in the available time T_available. Accordingly, transcoding system pipeline 108 can transcode these profiles for delivery at the content publishing time. In contrast, profiles 9-12 have a flag value of false. This value indicates that transcoding system pipeline 108 cannot transcode these profiles within the time T_available. These profiles may not be transcoded and ready for publishing at the content publishing time due to the longer transcoding time.

Figure 7:
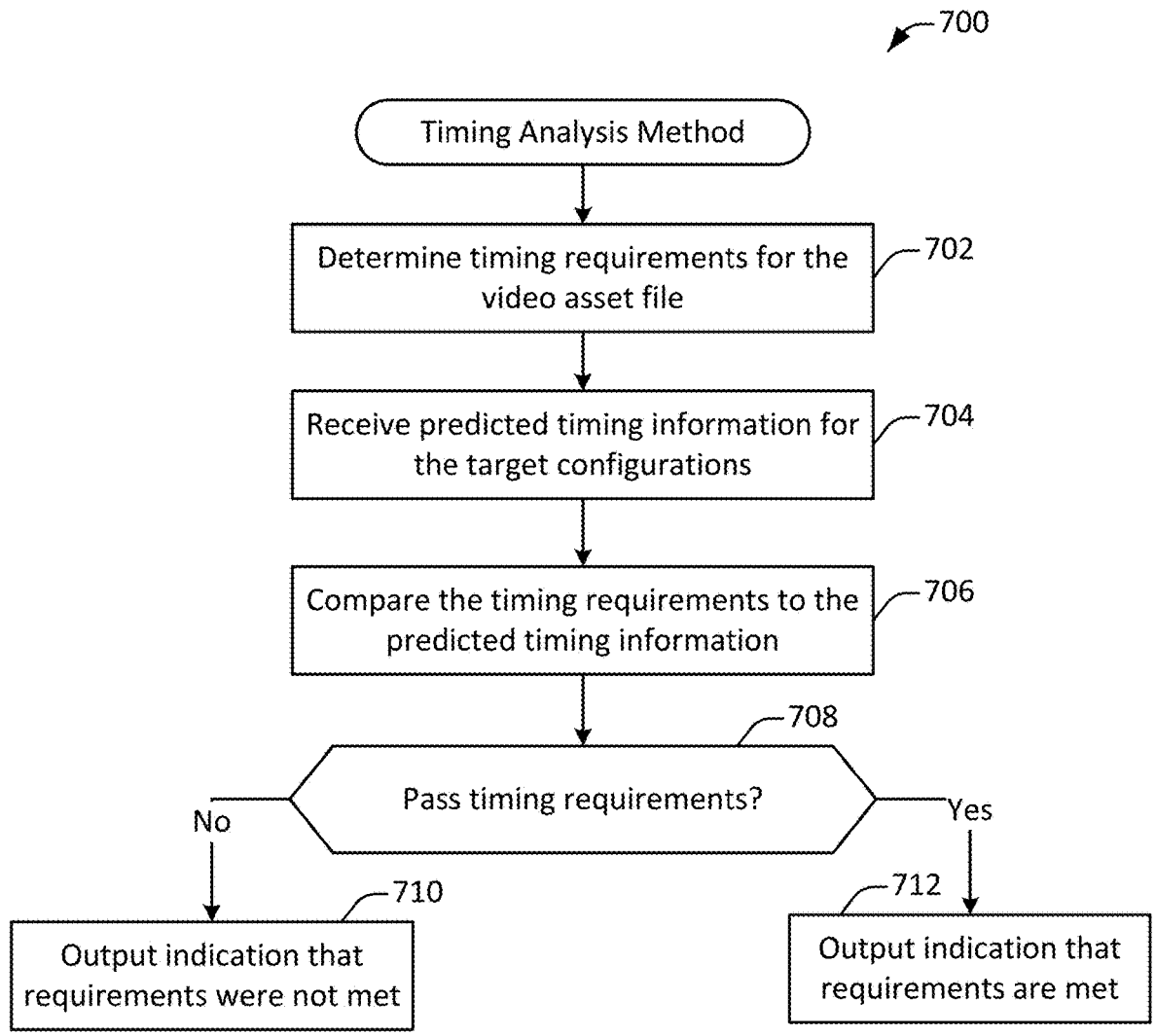
FIG. 7 depicts a simplified flowchart of a method for analyzing the transcoding timing estimation according to some embodiments.

The following describes a method for generating a value for the flag ABR_profile_pass_flag. FIG. 7 depicts a simplified flowchart 700 of a method for analyzing the transcoding timing estimation according to some embodiments. At 702, optimization strategy engine 306 receives a timing requirement for a video asset file. For example, as discussed above, the time T_available may be calculated based on the content publishing time, the content arrival time, and the times $T_a$, $T_{a1}$, and $T_c$. This information is shown in column 610 of FIG. 6. At 704, optimization strategy engine 306 receives the transcoding timing estimations for the target configurations. This information is shown in column 612 of FIG. 6.

At 706, optimization strategy engine 306 compares the timing requirement to the transcoding timing estimation for the profiles. For example, optimization strategy engine 306 may subtract the available time minus the predicted transcoding timing estimation. For example, for profile 2, the value of 14,400−1,800=12,600 is determined. At 708, optimization strategy engine 306 determines if the timing requirement is met. In one example, if the output is a positive number, then optimization strategy engine 306 may determine that the timing requirement is met. A threshold may also be used, such as 1,000 seconds, and if the output meets the threshold, such as is greater than the threshold, then optimization strategy engine 306 may determine the timing requirement is met. The threshold may be used to provide a buffer to allow for variations in transcoding time. For example, the available time to transcode the profile should be 1000 seconds more than the transcoding time. If the timing requirement is not met, then at 710, optimization strategy engine 306 an indication the requirements are not met. For example, optimization strategy engine 306 may set the flag ABR_profile_pass_flag to false. If the timing requirement is met, at 712, optimization strategy engine 306 may output an indication that the requirement is met, such as setting the flag ABR_profile_pass_flag to the value of true.

Optimization strategy engine 306 may generate an optimization strategy using the output of the flag ABR_profile_pass_flag. In some embodiments, an optimization strategy may be to start transcoding of the profiles that meet the timing requirement. Profiles that did not meet the timing requirement may not be transcoded at this time, but may be started at a later time. In other embodiments, if enough computing resources are available, the profiles that do not meet the timing requirement may be started, but may not finish by the required content publishing time. However, at a later time when additional profiles are published, these profiles may be published at that time. In some embodiments, optimization strategy engine 306 may analyze the available computing resources and the predicted transcoding timing estimation to determine whether to start the transcoding jobs for profiles that do not meet the timing requirement. For example, if optimization strategy engine 306 determines that there are available computing resources that will not affect the transcoding time of the profiles that can meet the timing requirement, then optimization strategy engine 306 may start the transcoding for all profiles. Also, the output may also be used to determine which profiles can be transcoded to meet the timing requirement and used to notify systems that need this information. For example, preparation for publishing the profiles at video delivery system 106 may begin using the prediction.

Figure 8:
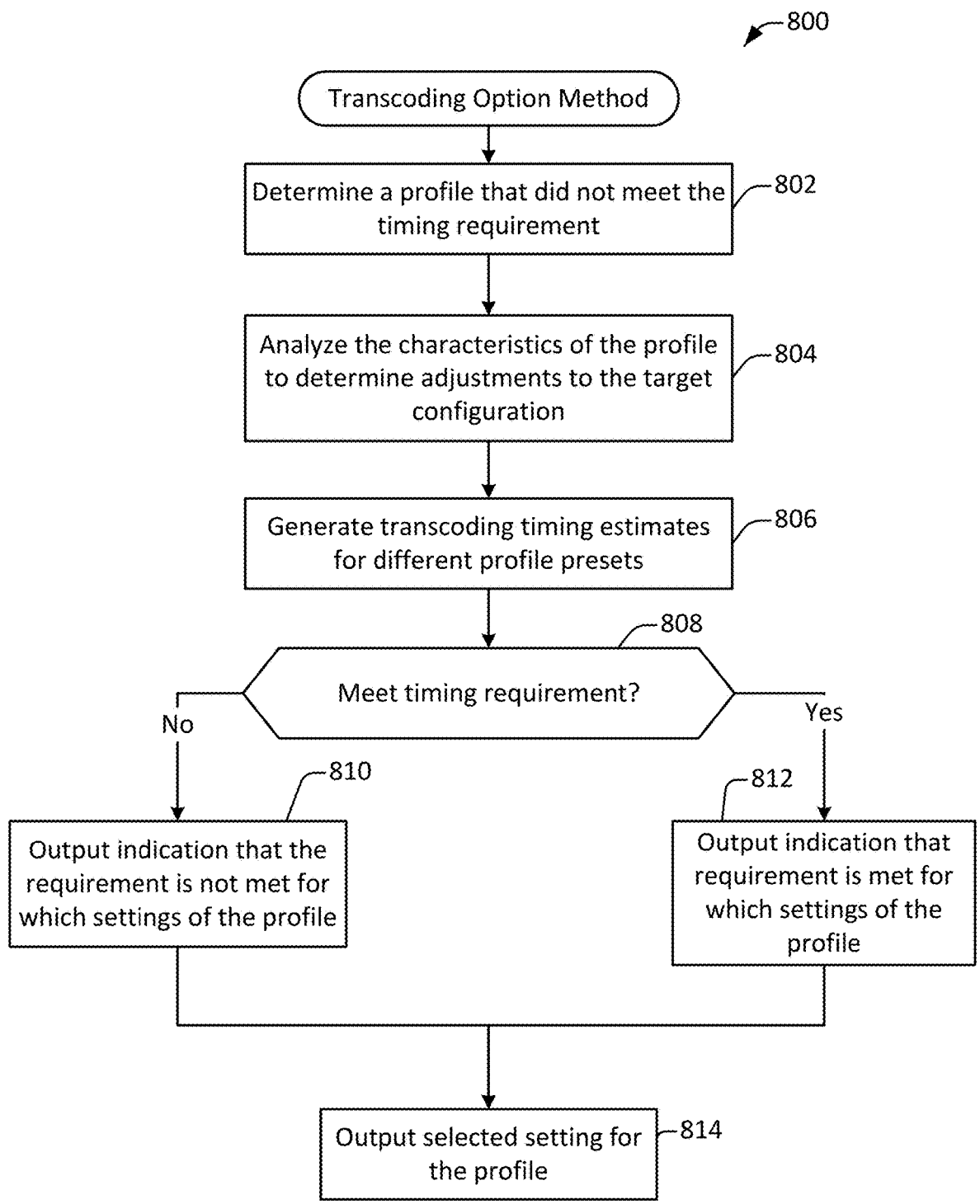
FIG. 8 depicts a simplified flowchart of a method for analyzing additional transcoding options for profiles that do not meet the timing requirement according to some embodiments.

In addition to the above strategy, optimization strategy engine 306 may attempt to adjust the characteristics of a profile that did not meet the timing requirement such that the profile can meet the timing requirement. FIGS. 8-9 depict an optimization strategy for profiles that do not meet the timing requirement according to some embodiments.

FIG. 8 depicts a simplified flowchart 800 of a method for analyzing additional transcoding options for profiles that do not meet the timing requirement according to some embodiments. At 802, optimization strategy engine 306 determines a profile that did not meet the timing requirement. For example, a profile 11 did not meet the timing requirement because the transcoding time of 21,600 is longer than the timing requirement of 14,400.

Figure 9A:
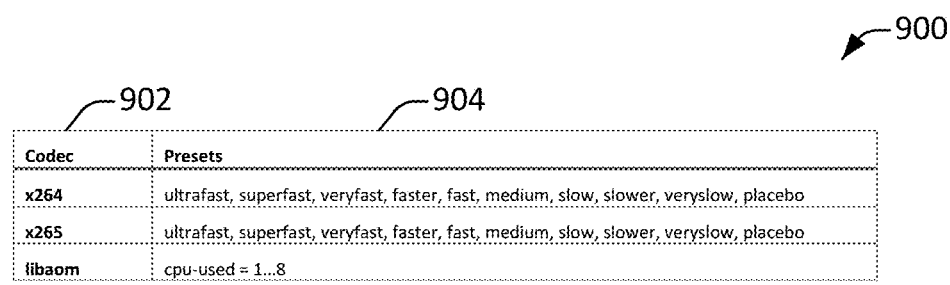
FIG. 9A depicts an example of different presets according to some embodiments.
Figure 9B:
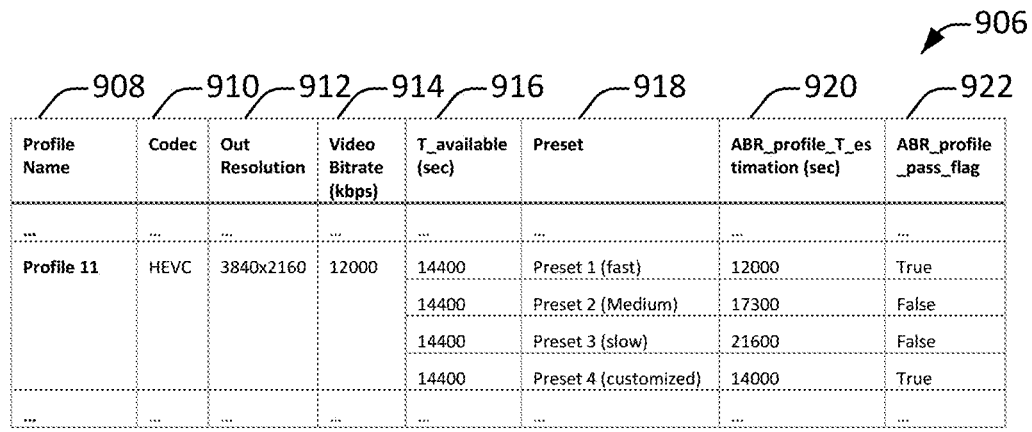
FIG. 9B depicts an example of results when performing the optimization using different presets according to some embodiments.

At 804, optimization strategy engine 306 may analyze the characteristics of the profile to determine adjustments to a target configuration for the profile. For example, different profiles may have the possibility of using different presets that could change the transcoding time. For example, a transcoding standard may specify different presets that may be used. A preset may be a different setting that could be used to transcode the video asset file for the profile. An example of different presets that may be used is shown in FIG. 9A and will be described later. At 806, optimization strategy engine 306 may generate transcoding timing estimates for different profile presets. For example, different settings may yield different transcoding timing estimations. An example of different results is shown in FIG. 9B, which will be described below.

At 808, optimization strategy engine 306 determines which presets meet the timing requirement. If some presets do not meet the timing requirement, at 810, optimization strategy engine 306 outputs an indication that the requirement is not met for which settings of the profile. The output may be a value for the ABR_profile_pass_flag as discussed above. If some settings do meet the timing requirement, at 812, optimization strategy engine 306 outputs an indication that the requirement is met for which settings of the profile.

At 814, optimization strategy engine 306 may analyze the indications and select a setting for the profile, if any meet the timing requirement. For example, for the presets that meet the timing requirement, optimization system 110 may select one of the presets, such as the preset that may result in the highest quality transcoding that meets the timing requirement may be selected.

An example of selecting different presets will now be described. FIG. 9A depicts an example of different presets according to some embodiments. A table 900 depicts different presets that could be used for a profile. For example, for a codec of x264, different presets of ultrafast, superfast, very fast, faster, fast, medium, slow, slower, very slow, placebo. These presets may be set on the codec and may affect the transcoding time, such as an "ultrafast" preset transcodes a video faster than a "slow" presets. Similarly, the codec x265 may also include the same presets. Also, a codec of libaom may have a preset that indicates how many CPUs to use. More CPUs may result in a faster transcoding time.

FIG. 9B depicts an example of results when performing the optimization using different presets according to some embodiments. In FIG. 9B, a table 906 shows an example of transcoding timing estimations using different presets. Column 908 depicts the profile name, column 910 depicts the codec type, column 912 depicts the output resolution, and a column 914 depicts the video bitrate of the profile. Column 916 depicts the time for the timing requirement.

Column 918 depicts examples of different presets for a codec. For example, a first setting of preset 1 (fast), a second setting of preset 2 (medium), a third setting of preset 3 (slow) and a fourth setting of preset 4 (customized) may be used. The customized preset may be specially configured, such as a combination of different presets or a preset not offered by the standard. These presets may be set for the codec that performs the transcoding. The prediction network may be trained to generate transcoding timing estimations for the different presets. A column 920 depicts the new estimated transcoding time when using the different presets. For example, using preset 1 results in a transcoding timing estimation of 12,000 seconds; using preset 2 results in 17,300 seconds; preset 3 is 21,600 seconds; and preset 4 is 14,000 seconds. Compared to the timing requirement of 14,400 seconds, preset 1 and preset 4 pass the timing requirement and preset 2 and preset 3 do not meet the timing requirement. For example, preset 1 has a time of 12,000 seconds, which is less than 14,400 seconds and preset 4 has an estimated time of 14,000 seconds, which is less than 14,400 seconds. However, preset 2 has a time of 17,300 seconds and preset 3 has a time of 21,600 seconds, which are both greater than the timing requirement of 14,400 seconds. In some embodiments, optimization system 110 may select one of the presets if multiple presets meet the timing requirement. For example, optimization strategy engine 306 may select preset 4 because this preset may be configured to transcode the video asset file at a higher quality compared to preset 1. Accordingly, by selecting the presets to use, a profile may be transcoded to meet the timing requirement, which may be an improvement over not being able to transcode the profile to meet the timing requirement if a preset is not used or a default preset is used.

Figure 10:
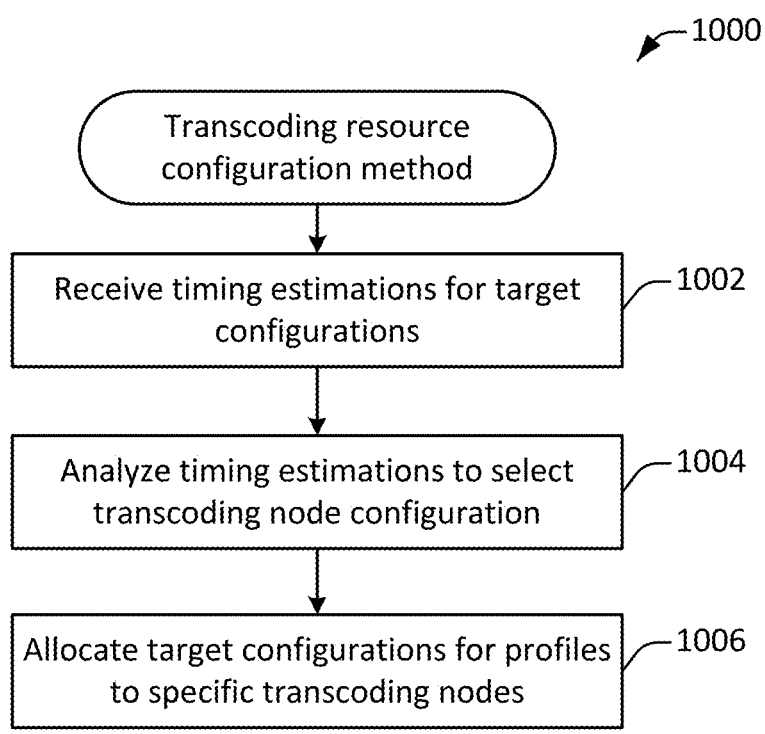
FIG. 10 depicts a simplified flowchart of a method for allocating computing resources according to some embodiments.

Optimization strategy engine 306 may also optimize the orchestration of computing resources in transcoding system pipeline 108, such as by selecting a transcoding node in which a transcoding job for a profile is allocated. A transcoding node may be a configuration of computing resources, such as CPUs, codec, etc. The allocation may improve the use of computing resources. FIG. 10 depicts a simplified flowchart 1000 of a method for allocating computing resources according to some embodiments. At 1002, optimization strategy engine 306 receives transcoding timing estimations for the target configurations. The transcoding timing estimations may be the estimated transcoding time for target configurations that can be transcoded within the timing requirement. At 1004, optimization system 110 may analyze the transcoding timing estimations to select the transcoding node configuration. For example, as will be described in more detail below in FIG. 11, optimization system 110 may select from different transcoding nodes that have different performance capabilities. For example, low-end transcoding nodes may transcode a video asset file with a lower performance (take more time) and high-end transcoding nodes may transcode a video asset file with a higher performance (faster or higher quality).

At 1006, optimization system 110 may allocate target configurations for profiles to specific transcoding nodes. The allocation may send different transcoding configurations to different transcoding nodes to perform the transcoding of the respective profiles. FIG. 11 depicts a table 1100 that shows information that summarizes information that is used to generate an optimization strategy according to some embodiments. Transcoding computing resources may be classified in different classifications depending on different characteristics of the transcoding nodes. In some examples, computing resources may be classified into two classifications, but other classifications may be used. A first classification may be low-end computing nodes and a second classification may be high-end computing nodes. Generally, the low-end computing nodes may have a lower performance compared to the high-end computing nodes. Low-end computing nodes may be computing machines, such as servers, which may have lower performance computing resources, such as CPUs, or may be older. These computing nodes may transcode a video asset file slower compared to the high-end computing nodes. High-end computing nodes may have computing resources that are considered high performance, such as more CPUs that operate using a higher frequency, etc. In general, high-end computing nodes may transcode a video asset file faster, but the cost to transcode a video asset file may be at a higher cost compared to the low end computing node. The higher cost may be because a company is charged based on the computing resources that are used in a data center.

In table 1100, columns 1102, 1104, 1106, and 1108 correspond to a profile name, output resolution, video bitrate, and timing requirement. A column 1110 may be a transcoding timing estimation for the low-end group of computing nodes. Column 1112 may be a flag indicating whether or not the transcoding timing estimation for the low-end computing group meets the timing requirement in column 1108. For example, for profile 4, the transcoding timing estimation of 13,900 meets the timing requirement of 14,400, and is assigned a True value. However, for a profile 5, the transcoding timing estimation of 14,800 does not meet the timing requirement of 14,400, and is assigned a False value.

A column 1114 is a transcoding timing estimation for the high-end group and a column 1116 is a pass flag for the high-end group. The pass flag for the low-end group and the pass flag for the high-end group may include different values. For example, profiles 1-8 may meet the timing requirement for the high-end group while profiles 1-4 meet the timing requirement for the low-end group. Accordingly, profiles 5-12 do not meet the timing requirement for the low-end group and profiles 9-12 do not meet the timing requirement for the high-end group.

Optimization strategy engine 306 may use the results in table 1100 to perform different optimization strategies. In the above example, for profiles 1 to 4, both the low-end group and the high-end group can finish the transcoding of the profiles in the available time according to the timing requirement. Optimization strategy engine 306 may select the low-end group for these profiles to save costs. For profiles 5 to 8, only the high-end group can finish transcoding the profiles to meet the timing requirement. Optimization strategy engine 306 may select the high-end nodes for those profiles. For profiles 9 to 12, these profiles cannot be transcoded according to the timing requirement no matter what type of computing node is used. Optimization strategy engine 306 may cancel the transcoding of these profiles to save computing resources and these profiles may be transcoded at a later time. Also, the profiles may be transcoded using low-end computing nodes since they will not be published at the content publishing time, but will be published after the content publishing time.

Accordingly, optimization system 110 may use the transcoding timing estimation to efficiently allocate transcoding jobs to different nodes. This may more efficiently use the computing resources, and also save costs.

In conclusion, optimization system 110 may avoid problems of failing to publish content on time or wasting available transcoding time. Instead of using a fixed time or an uncertain time of how long a video asset file may take to transcode, optimization system 110 uses a predicted video transcoding time that is generated before the transcoding job starts. Different characteristics of different video asset files may yield different transcoding timing predictions. Accordingly, the transcoding timing prediction may be improved by being personalized to video asset files. Also, different target configurations may be supported by the transcoding timing prediction. If one setting of a target configuration does not meet the timing requirement, optimization system 110 may select another setting. This may allow a profile to be transcoded within the timing requirement, which may not have previously occurred. All of the above may optimize the transcoding of a video asset file into different profiles when a timing requirement is imposed on the content publishing time.

System

Figure 12:
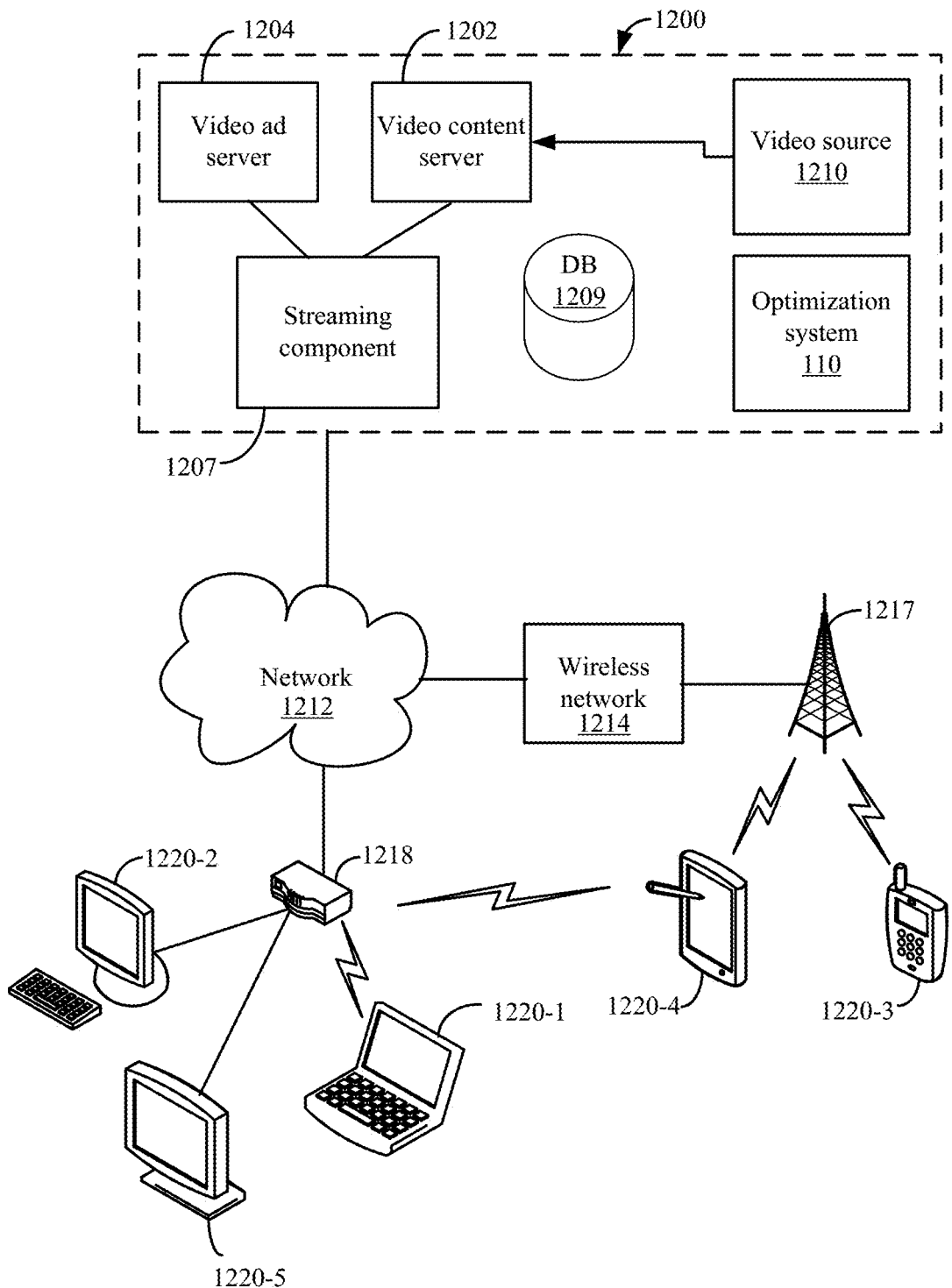
FIG. 12 depicts a video streaming system in communication with multiple client devices via one or more communication networks according to one embodiment.

Features and aspects as disclosed herein may be implemented in conjunction with a video streaming system 1200 in communication with multiple client devices via one or more communication networks as shown in FIG. 12. Aspects of the video streaming system 1200 are described merely to provide an example of an application for enabling distribution and delivery of content prepared according to the present disclosure. It should be appreciated that the present technology is not limited to streaming video applications and may be adapted for other applications and delivery mechanisms.

In one embodiment, a media program provider may include a library of media programs. For example, the media programs may be aggregated and provided through a site (e.g., website), application, or browser. A user can access the media program provider's site or application and request media programs. The user may be limited to requesting only media programs offered by the media program provider.

In system 1200, video data may be obtained from one or more sources for example, from a video source 1210, for use as input to a video content server 1202. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner or transcoder. The input video data may comprise video clips or programs of various types, for example, television episodes, motion pictures, and other content produced as primary content of interest to consumers. The video data may also include audio or only audio may be used.

The video streaming system 1200 may include one or more computer servers or modules 1202, 1204, and 1207 distributed over one or more computers. Each server 1202, 1204, 1207 may include, or may be operatively coupled to, one or more data stores 1209, for example databases, indexes, files, or other data structures. A video content server 1202 may access a data store (not shown) of various video segments. The video content server 1202 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 1204 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 1200, a public service message, or some other information. The video advertising server 1204 may serve the video advertising segments as directed by a user interface controller (not shown).

The video streaming system 1200 also may include optimization system 110.

The video streaming system 1200 may further include an integration and streaming component 1207 that integrates video content and video advertising into a streaming video segment. For example, streaming component 1207 may be a content server or streaming media server. A controller (not shown) may determine the selection or configuration of advertising in the streaming video based on any suitable algorithm or process. The video streaming system 1200 may include other modules or units not depicted in FIG. 12, for example, administrative servers, commerce servers, network infrastructure, advertising selection engines, and so forth.

The video streaming system 1200 may connect to a data communication network 1212. A data communication network 1212 may comprise a local area network (LAN), a wide area network (WAN), for example, the Internet, a telephone network, a wireless cellular telecommunications network (WCS) 1214, or some combination of these or similar networks.

One or more client devices 1220 may be in communication with the video streaming system 1200, via the data communication network 1212, wireless cellular telecommunications network 1214, or another network. Such client devices may include, for example, one or more laptop computers 1220-1, desktop computers 1220-2, "smart" mobile phones 1220-3, tablet devices 1220-4, network-enabled televisions 1220-5, or combinations thereof, via a router 1218 for a LAN, via a base station 1217 for a wireless cellular telecommunications network 1214, or via some other connection. In operation, such client devices 1220 may send and receive data or instructions to the system 1200, in response to user input received from user input devices or other input. In response, the system 1200 may serve video segments and metadata from the data store 1209 responsive to selection of media programs to the client devices 1220. Client devices 1220 may output the video content from the streaming video segment in a media player using a display screen, projector, or other video output device, and receive user input for interacting with the video content.

Distribution of audio-video data may be implemented from streaming component 1207 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 1207 may communicate with client device 1220 using control messages and data messages to adjust to changing network conditions as the video is played. These control messages can include commands for enabling control functions such as fast forward, fast reverse, pausing, or seeking to a particular part of the file at the client.

Since streaming component 1207 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 1207 may use TCP-based protocols, such as HyperText Transfer Protocol (HTTP) and Real Time Messaging Protocol (RTMP). Streaming component 1207 can also deliver live webcasts and can multicast, which allows more than one client to tune into a single stream, thus saving bandwidth. Streaming media players may not rely on buffering the whole video to provide random access to any point in the media program. Instead, this is accomplished using control messages transmitted from the media player to the streaming media server. Other protocols used for streaming are HTTP live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 13:
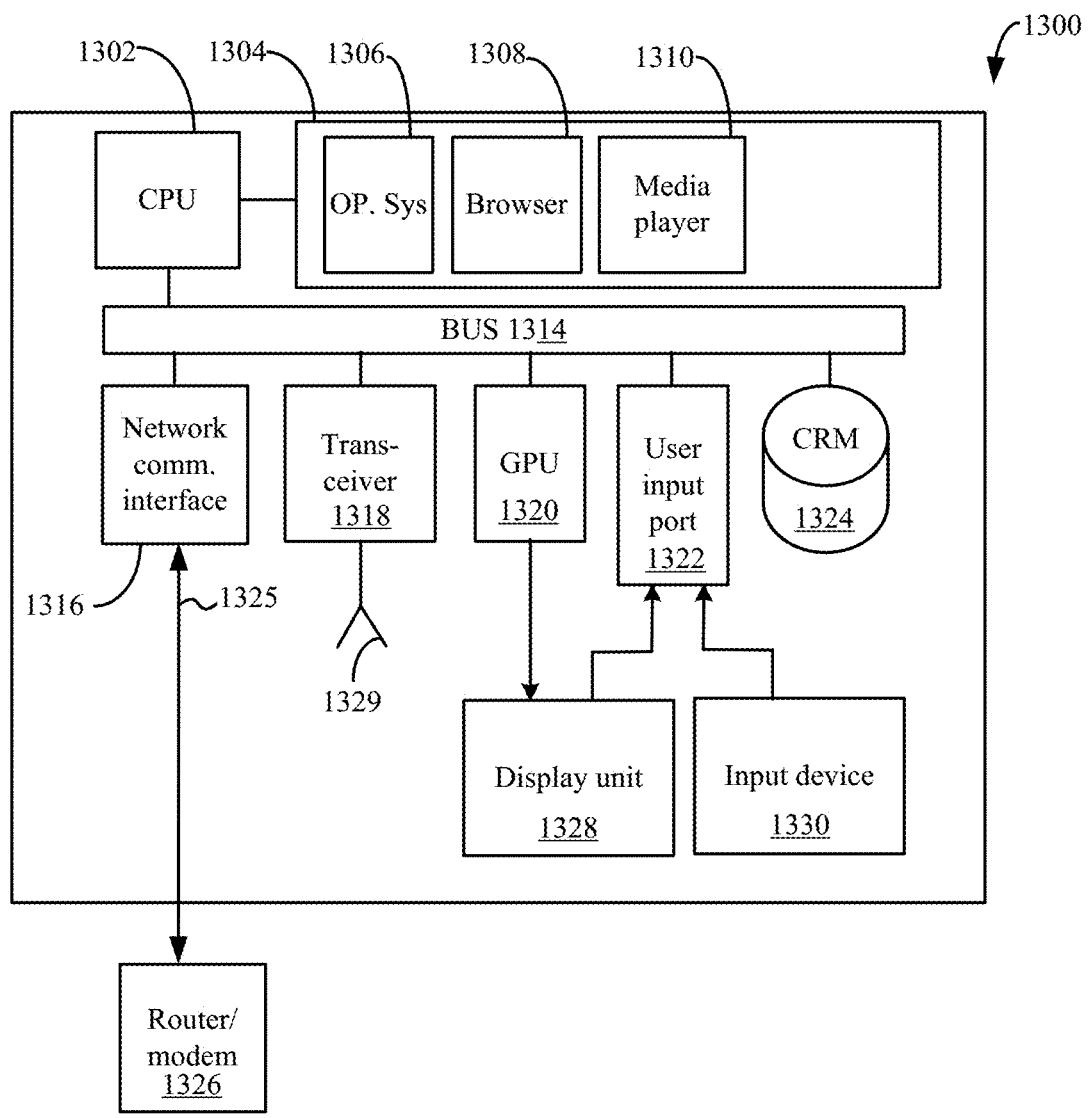
FIG. 13 depicts a diagrammatic view of an apparatus for viewing video content and advertisements.

Referring to FIG. 13, a diagrammatic view of an apparatus 1300 for viewing video content and advertisements is illustrated. In selected embodiments, the apparatus 1300 may include a processor (CPU) 1302 operatively coupled to a processor memory 1304, which holds binary-coded functional modules for execution by the processor 1302. Such functional modules may include an operating system 1306 for handling system functions such as input/output and memory access, a browser 1308 to display web pages, and media player 1310 for playing video. The memory 1304 may hold additional modules not shown in FIG. 13, for example modules for performing other operations described elsewhere herein.

A bus 1314 or other communication component may support communication of information within the apparatus 1300. The processor 1302 may be a specialized or dedicated microprocessor configured or operable to perform particular tasks in accordance with the features and aspects disclosed herein by executing machine-readable software code defining the particular tasks. Processor memory 1304 (e.g., random access memory (RAM) or other dynamic storage device) may be connected to the bus 1314 or directly to the processor 1302, and store information and instructions to be executed by a processor 1302. The memory 1304 may also store temporary variables or other intermediate information during execution of such instructions.

A computer-readable medium in a storage device 1324 may be connected to the bus 1314 and store static information and instructions for the processor 1302; for example, the storage device (CRM) 1324 may store the modules 1306, 1308, and 1310 when the apparatus 1300 is powered off, from which the modules may be loaded into the processor memory 1304 when the apparatus 1300 is powered up. The storage device 1324 may include a non-transitory computer-readable storage medium holding information, instructions, or some combination thereof, for example instructions that when executed by the processor 1302, cause the apparatus 1300 to be configured or operable to perform one or more operations of a method as described herein.

A network communication (comm.) interface 1316 may also be connected to the bus 1314. The network communication interface 1316 may provide or support two-way data communication between the apparatus 1300 and one or more external devices, e.g., the streaming system 1200, optionally via a router/modem 1326 and a wired or wireless connection. In the alternative, or in addition, the apparatus 1300 may include a transceiver 1318 connected to an antenna 1329, through which the apparatus 1300 may communicate wirelessly with a base station for a wireless communication system or with the router/modem 1326. In the alternative, the apparatus 1300 may communicate with a video streaming system 1200 via a local area network, virtual private network, or other network. In another alternative, the apparatus 1300 may be incorporated as a module or component of the system 1200 and communicate with other components via the bus 1314 or by some other modality.

The apparatus 1300 may be connected (e.g., via the bus 1314 and graphics processing unit 1320) to a display unit 1328. A display 1328 may include any suitable configuration for displaying information to an operator of the apparatus 1300. For example, a display 1328 may include or utilize a liquid crystal display (LCD), touchscreen LCD (e.g., capacitive display), light emitting diode (LED) display, projector, or other display device to present information to a user of the apparatus 1300 in a visual display.

One or more input devices 1330 (e.g., an alphanumeric keyboard, microphone, keypad, remote controller, game controller, camera, or camera array) may be connected to the bus 1314 via a user input port 1322 to communicate information and commands to the apparatus 1300. In selected embodiments, an input device 1330 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 1328, for example using a touch sensitive screen. A cursor control device may communicate direction information and command selections to the processor 1302 and control cursor movement on the display 1328. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:
   receiving a file for transcoding, wherein a timing requirement is associated with the transcoding of the file;
   generating a prediction of a timing estimation based on characteristics of the file and a set of target configurations, wherein a target configuration in the set of target configurations is associated with a transcoding setting;
   analyzing the timing estimation for the set of target configurations and the timing requirement to determine a transcoding configuration of a transcoding system; and
   outputting the transcoding configuration to configure the transcoding system to transcode the file, wherein the file is to be transcoded using at least a portion of the set of target configurations based on configuring of the transcoding system;
   transcoding the file using the set of target configurations; and
   terminating a transcoding using a target configuration when the timing estimation for the target configurations does not meet the timing requirement.

2. The method of claim 1, wherein the timing requirement is a time restriction for transcoding the file.

3. The method of claim 1, wherein generating the prediction of the timing estimation comprises:
   extracting a feature of the file; and
   using the feature and a target configuration to predict the timing estimation.

4. The method of claim 1, wherein generating the prediction of the timing estimation comprises:
   extracting a feature of the file; and
   using the feature and the set of target configurations to predict the timing estimation for each of the set of target configurations.

5. The method of claim 1, wherein a target configuration in the set of target configurations is used by the transcoding system to transcode the file.

6. The method of claim 1, wherein analyzing the timing estimation and the timing requirement comprises:
   comparing a timing estimation for a target configuration to the timing requirement; and
   determining whether the file can be transcoded to meet the timing requirement.

7. The method of claim 6, wherein analyzing the timing estimation and the timing requirement comprises:
   outputting an indication whether the file can be transcoded to meet the timing requirement.

8. The method of claim 1, wherein outputting the configuration comprises:
   determining one or more of the set of target configurations to use to transcode the file based on the analyzing.

9. The method of claim 8, wherein the one or more of the set of target configurations is based on the transcoding of a target configuration meeting the timing requirement.

10. The method of claim 8, wherein a first portion of the set of target configurations is selected for publication at a first publication time, wherein publication is when a transcoded file can be requested for delivery to a device.

11. The method of claim 10, wherein a second portion of the set of target configurations is selected for publication at a second publication time, wherein second publication time is later than the first publication time.

12. The method of claim 1, wherein generating the prediction of the timing estimation comprises:
generating a first prediction of a first timing estimation for a first type of computing resource;
generating a second prediction of a second timing estimation for a second type of computing resource; and
using the first timing estimation and the second timing estimation to select the first type of computing resource or the second type of computing resource for transcoding a target configuration.

13. The method of claim 12, wherein using the first timing estimation and the second timing estimation comprises:
allocating, in the configuration, a first target configuration of the set of target configurations to the first type of computing resource; and
allocating, in the configuration, a second target configuration of the set of target configurations to the second type of computing resource.

14. The method of claim 12, further comprising:
the first type of computing resource is associated with a first transcoder that is used to transcode the file; and
the second type of computing resource is associated with a second transcoder that is used to transcode the file.

15. The method of claim 12, wherein:
analyzing the first timing estimation and the second timing estimation to determine which of the first timing estimation or the second timing estimation meet the timing requirement; and
selecting one of the first timing estimation or the second timing estimation based on which of the first timing estimation or the second timing estimation meet the timing requirement.

16. The method of claim 15, wherein:
the first type of computing resource is selected when the first timing estimation and the second timing estimation meet the timing requirement,
the second type of computing resource is selected when the first timing estimation does not meet the timing requirement and the second timing estimation meets the timing, and
the first type of computing resource is selected when the first timing estimation and the second timing estimation do meet the timing.

17. The method of claim 1, wherein generating the prediction of the timing estimation comprises:
generating the prediction of the timing estimation for a portion of the file.

18. A non-transitory computer-readable storage medium having stored thereon computer executable instructions, which when executed by a computing device, cause the computing device to be operable for:
receiving a file for transcoding, wherein a timing requirement is associated with the transcoding of the file;
generating a prediction of a timing estimation based on characteristics of the file and a set of target configurations, wherein a target configuration in the set of target configurations is associated with a transcoding setting;
analyzing the timing estimation for the set of target configurations and the timing requirement to determine a transcoding configuration of a transcoding system; and
outputting the transcoding configuration to configure the transcoding system to transcode the file, wherein the file is to be transcoded using at least a portion of the set of target configurations based on configuring of the transcoding system;
transcoding the file using the set of target configurations; and
terminating a transcoding using a target configuration when the timing estimation for the target configurations does not meet the timing requirement.

19. An apparatus comprising:
one or more computer processors; and
a computer-readable storage medium comprising instructions for controlling the one or more computer processors to be operable for:
receiving a file for transcoding, wherein a timing requirement is associated with the transcoding of the file;
generating a prediction of a timing estimation based on characteristics of the file and a set of target configurations, wherein a target configuration in the set of target configurations is associated with a transcoding setting;
analyzing the timing estimation for the set of target configurations and the timing requirement to determine a transcoding configuration of a transcoding system;
outputting the transcoding configuration to configure the transcoding system to transcode the file, wherein the file is to be transcoded using at least a portion of the set of target configurations based on configuring of the transcoding system;
transcoding the file using the set of target configurations; and
terminating a transcoding using a target configuration when the timing estimation for the target configurations does not meet the timing requirement.

* * * * *